United States Patent [19]

Fujiwara

[11] Patent Number: 4,785,861
[45] Date of Patent: * Nov. 22, 1988

[54] HIGH PERFORMANCE TIRE
[75] Inventor: Kenichi Fujiwara, Miki, Japan
[73] Assignee: Sumitomo Rubber Industries, Ltd., Japan
[*] Notice: The portion of the term of this patent subsequent to Nov. 15, 2005 has been disclaimed.
[21] Appl. No.: 854,783
[22] Filed: Apr. 23, 1986
[30] Foreign Application Priority Data Apr. 24, 1985 [JP] Japan ................................. 60-89514

[51] Int. Cl.$^4$ ................................................ B60C 11/03
[52] U.S. Cl. ................................ 152/209 R; 152/454; 152/538
[58] Field of Search ............ 152/200 RD, 200 B, 454, 152/456, 538

[56]  References Cited
U.S. PATENT DOCUMENTS 4,037,637  7/1977  Arimura et al. ................... 152/454
4,082,132  4/1978  Arai et al. ........................... 152/454
4,461,334  7/1984  Tansei et al. ................... 152/209 R
4,545,415 10/1985  Lindner et al. ................. 152/209 R
4,546,808 10/1985  Fontaine et al. ................ 152/209 R Primary Examiner—Michael Ball
Assistant Examiner—Geoffrey L. Knable
Attorney, Agent, or Firm—Stevens, Davis, Miller & Mosher

[57]  ABSTRACT

A high performance tire, in which the profile of radially outer ground contacting tread surface is radially outwardly expanded at both shoulder parts when the tire is inflated, and the tread pattern circumferential stiffness as well as index of groove volume is optimized so that resistance in wear, durability to high speed running (low degree of heat generation), resistance to cutting, and resistance to rolling (low fuel consumption) including wet grip performance and stability in vehicle driving may be advantageously improved without reducing comfortableness in vehicle riding.

5 Claims, 15 Drawing Sheets

FIG. 10  Present Invention-1
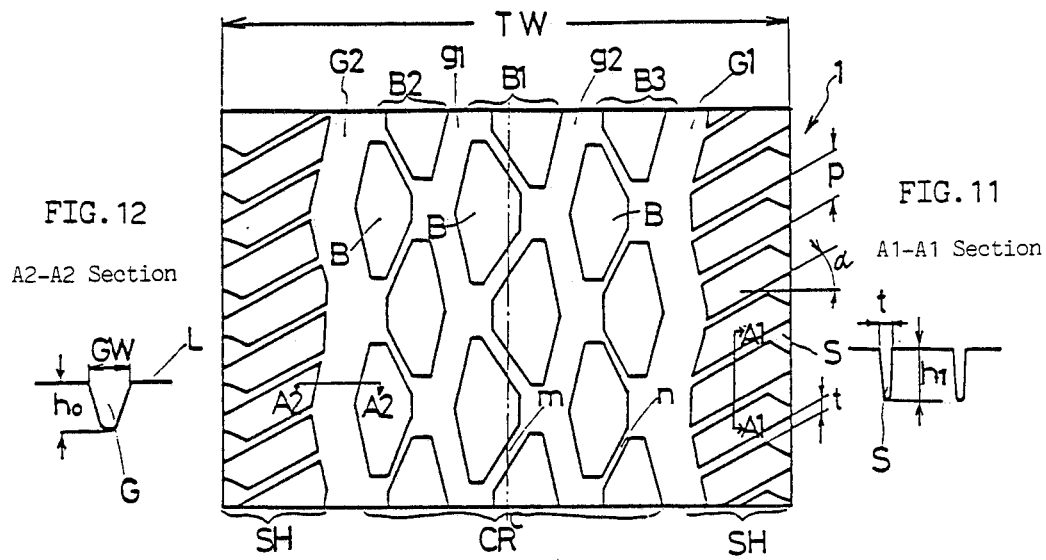
FIG. 12 A2-A2 Section
FIG. 11 A1-A1 Section
FIG. 13(a)  Prior Art-2
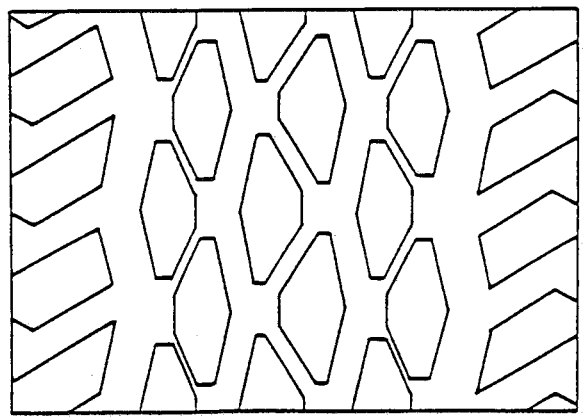

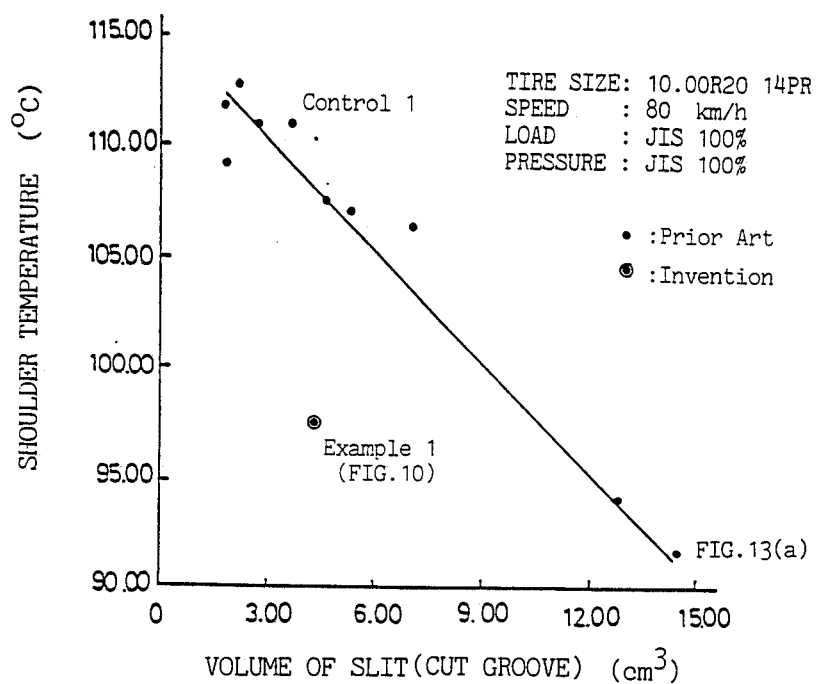
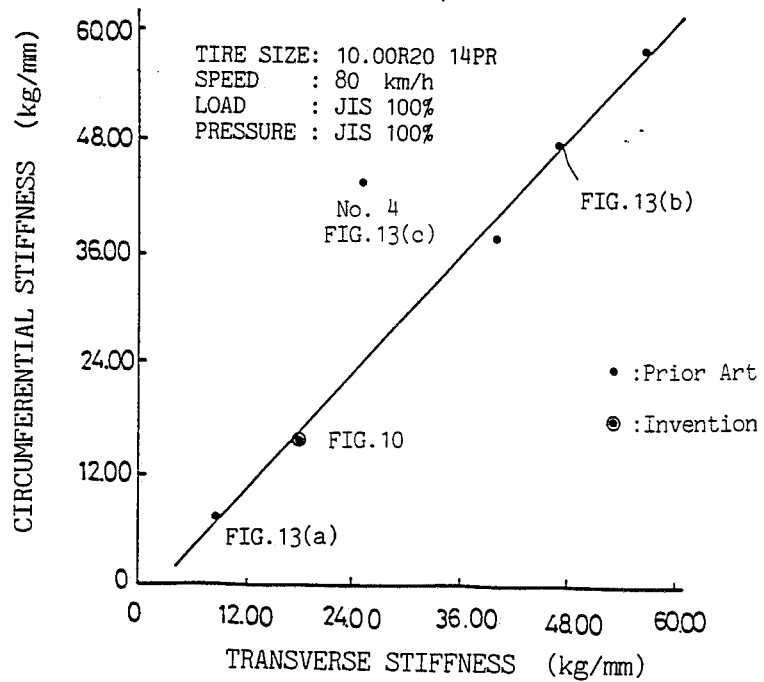

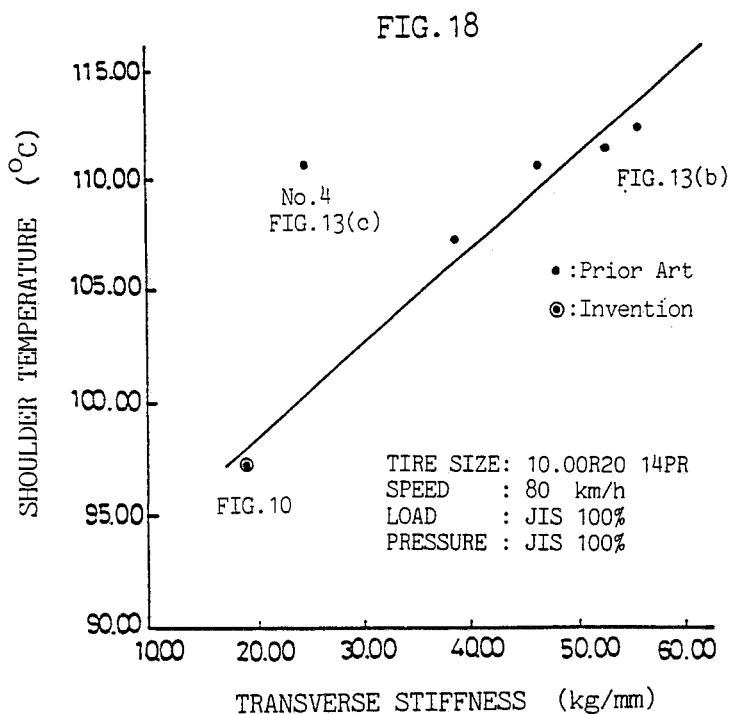
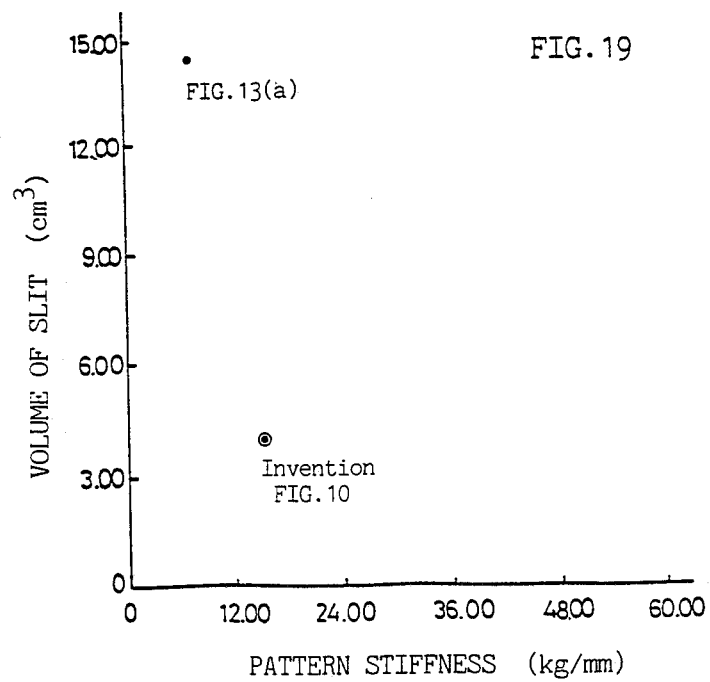

HIGH PERFORMANCE TIRE

BACKGROUND OF THE INVENTION

This invention relates to a pneumatic radial ply tire and, in particular, a radial tire suitable for use for a truck, bus, light truck, and other vehicles. It is intended for providing an improved radial tire, in which various requirements for this kind of a tire such as resistance to cutting, resistance to wear, durability to high speed running, low fuel consumption, and vehicle driving stability are well-balanced with each other and also with general characteristics indispensable for the tire such as comfortableness in vehicle riding and traction capacity without affecting these characteristics, while optimizing a radius of curvature of the radially expansive groundcontacting surface of the tread and cut grooves formed in the direction of the tire axis on its shoulder parts.

The main points of the prior art for achieving improvement in this resistance of tire to wear and cutting, durability to high speed running, and saving of fuel consumption have been such mean as the use of rubber highly resistant to wear and cutting for the ground contacting part of the tread preparation of rubber material low in gripping performance and high in repulsive resilience, or employment of a tread small in gauge, however, there have been fatal problems in that these means are all antinomic to each other because a tire designed to weigh heavily in resistance to wear and long life is insufficient in durability to high speed running and in fuel consumption and, on the contrary, a tire weighted in durability to high speed running and low fuel consumption is inevitably followed by short life because of fast wear.

BRIEF SUMMARY OF THE INVENTION

An object of this invention is to solve such problems as above in the prior art for obtaining improvement in resistance of the tread crown part to cutting and wear, durability of the tire to high speed running, saving of fuel consumption, and driving stability without decreasing comfortableness in vehicle riding and traction capacity of radial tire, particularly, that for truck and bus in well-balanced manner at the same time.

BRIEF DESCRIPTION OF THE DRAWINGS

FIG. 1 and FIG. 10 are a schematic radial section and a plan view respectively of a tread surface pattern of one embodiment of a tire according to this invention. In FIG. 1 the continuous line and the dotted line indicate a profile of a carcass line when the tire is inflated to the specified maximum internal air pressure and that when the tire is in the state before inflation (filled with air pressure of 5% of the said maximum internal air pressure), respectively, and the alternate long and short dash line indicates a base line of a carcass profile in the free balanced state;

FIGS. 11 and 12 are radial cross sections taken on the line A1—A1 and A2—A2 in FIG. 10;

FIG. 13(a) is a developed view of a pattern in which the index of circumferential stiffness satisfies a value specified by this invention but the index of groove volume is out of the scope of this claim;

FIG. 16 is a graph showing the relation between volumes of cut grooves and temperature;

FIG. 17 is a graph showing the relation between circumferential stiffness and transverse stiffness;

FIG. 18 is a graph showing the relation between transverse stiffness and temperature at the shoulder part;

FIG. 19 is a graph showing the relation between pattern stiffness and volume of groove;

DETAILED DESCRIPTION

Figure 1:
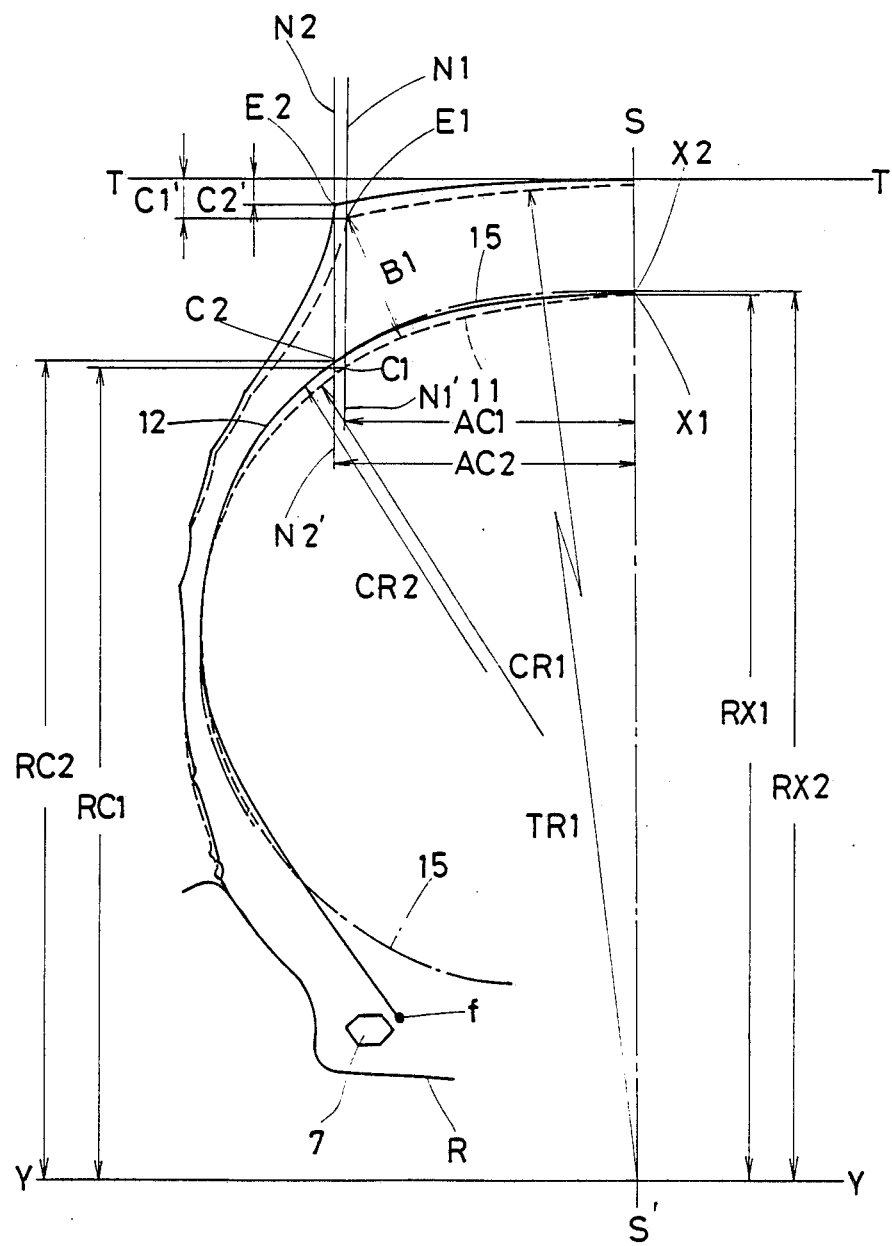
Figure 1:
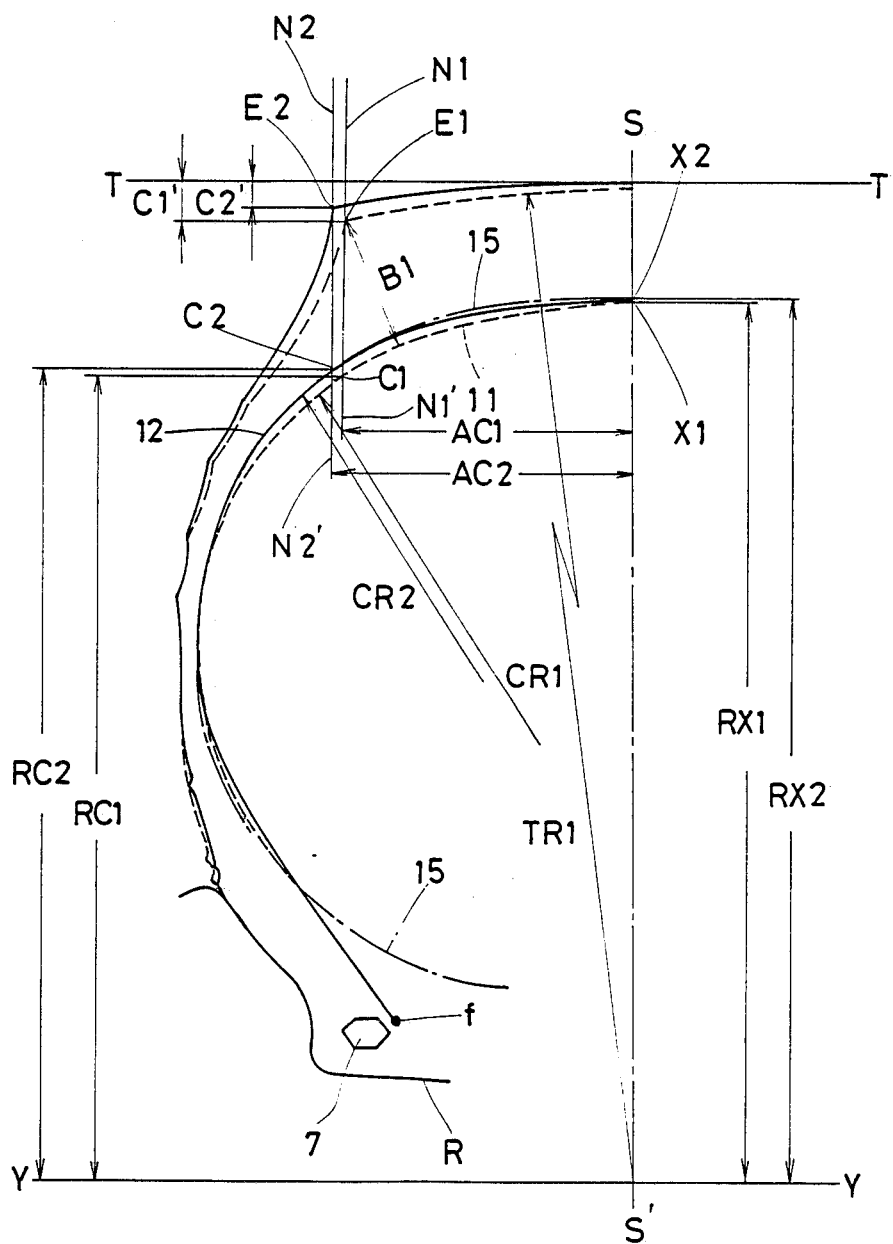

The technical problem as above can be solved by the following means:

A pneumatic radial ply tire is designed so as to comprise a tread reinforced with a carcass layer composed of at least a single layer of ply consisting of non-stretchable or low stretchable cords substantially radially arranged in parallel with each other and a belt layer composed of at least two layers of plies each consisting of cords arranged between the carcass layer and tread rubber, adjacent to the carcass layer, at a comparatively small degree of angle with respect to the direction of the tire circumference, and in parallel with each other in each ply crosswise when grouped into plies, and to be characterized in that a radius TR1 of the radially expansive surface of the tread produced when the tire is mounted on the rim officially specified for use and is inflated with air having 5% of the specified maximum pressure and another radius TR2 of curvature produced when the tire is inflated with air of the specified maximum pressure always to satisfy the relation such as $1.2 \leq TR2/TR1 \leq 1.5$; a profile in which the radius of curvature increases with the increase in air pressure is proved; the rubber surface of the tread is partitioned by the deepest two main vertical grooves running on the tire circumference in a zigzag pattern, wavy line, or straight line into a tread crown part having a width corresponding to about 30 to 65% of the tread width and centering at the equatorial plane of the tire and into tread shoulder parts lying on both sides outside the tread crown part; one or more central ribs or rows of central blocks comprising blocks in various shapes are provided on the crown part whereas outer ribs or outer rows of blocks are provided on both shoulder parts; and a plurality of narrow cut grooves running in the radial direction of the tire are provided for ribs or blocks on both shoulder parts so that a circumferential stiffness index of the pattern and a volume index of the cut grooves may be set at 30 to 70 and 2.5 to 15, respectively; wherein the cut groove is equal to or smaller than the vertical main groove in depth and not greater than 6 mm in width, preferably within the range from 1 to 3 mm, and a circumferential pitch between cut grooves is within the range from 1.1 to 0.1%, preferably 0.6 to 0.3%, of the circumference of the tire at the center of the tread under inflation at normal maximum inner pressure.

Generally, a radial ply tire for trucks and buses is of a size of 10.00R20 14PR which is typical of this kind of tire is provided with a tread having a radius of curvature ranging from 400 to 600 mm under no longer and a width from 180 to 200 mm when mounted on the rim of a size $7.50 \times 20$ and inflated with air of the regular maximum pressure of 7.25 kg/cm$^2$.

For obtaining even distribution of pressure against the ground surface, that is, for obtaining adequate gripping and uniform wear, a radius of curvature of the radially expansive surface of the tread should be as large as possible. It has been known from the past that the tread is preferably provided with a flat profile rendered by a large radius of curvature.

However, more important for obtaining not only excellent resistance of the tire to wear and cutting as one of objects of this invention but also fuel saving and driving stability is, although a large absolute value of a radius of curvature of the tread, to design a tread profile to have a radius of curvature by which compressive strain, not tensile one, is adapted to act within the tread crown part when the tire is inflated with air of the specified maximum pressure, such design enabling maintenance of transverse stiffness of the tread at high level throughout the use of the tire and, therefore, giving no disadvantage to vehicle drivability and driving stability. Similarly, wet gripping performance and traction capacity are improved because of the increase in stiffness of the part.

With reference to the drawings, an embodiment of this invention will be described in detail.

Figure 2:
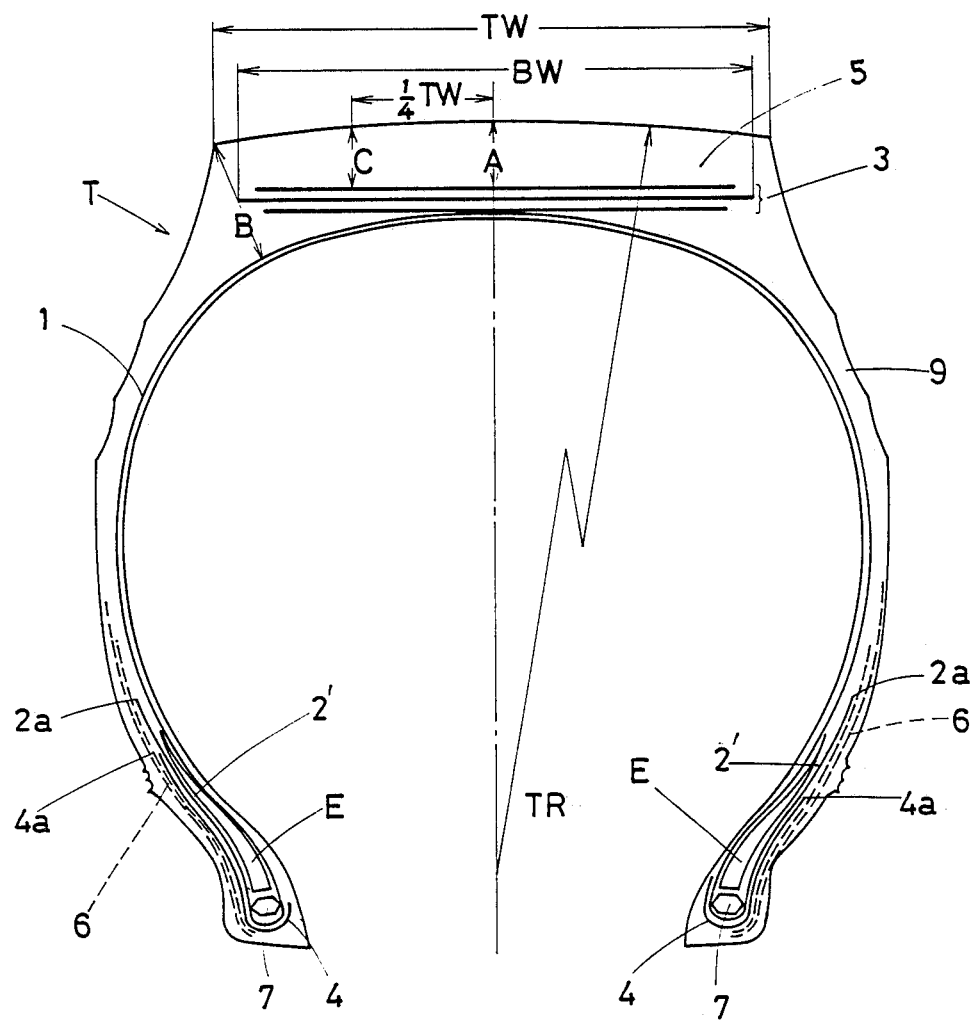
FIG. 2 is a view showing a cross-sectional structure of the steel radial tire to be used for a truck or a bus.

A tire T of such kind as above comprises, as shown in FIG. 2: a carcass 1 reinforced with at least a single ply composed of carcass cords, for example, steel cords, extending substantially radially; a tread 5 reinforced with a belt structure 3 composed of a plurality of plies consisting of non-stretchable or low-stretchable cords, these plies being arranged at a sharp bias angle, for example, an angle within the range from 10° to 70°, with respect to the direction of the tire circumference and being adapted to intersect with each other; a pair of bead cores 7 around which both ends of the carcass ply are wrapped from inside to outside for fixation; and a pair of side walls 9.

It is preferable that a width BW of the belt structure 3 reinforcing the tire tread ranges from 80 to 95% of the width TW of the tread 5 so that the tread may be widely and surely supported and reinforced. Further, the formation of a belt layer with cords intersecting with each other in a triangular pattern is advantageous for increase in stiffness thereof and reinforcement of the tread. That is to say, it is preferable for increasing stiffness of the belt structure that at least three plies each composed of low-stretchable or non-stretchable cords are stacked so as to be in direct contact with each other, wherein the adjacent two plies are arranged at bias angles equal in degree but directionally opposite to each other, preferably as small as ranging from 10° to 25°, with respect to the equatorial plane of the tire, and cords of the third ply provide an angle larger than that provided by cords of the former two plies, for example, within the range from 40° to 70° with respect to the above mentioned equatorial plane.

On the assumption that the belt layer is of highly stiff structure as above, the inventor of this invention, after examining in various ways a carcass line which is arranged on the side of the tire axis adjacent to the belt layer and closely relates to a radius of tread curvature when the tire is inflated, have found that, as shown in FIG. 1: carcass parts expect at the crown part are firmly bound by the hoop effect of the stiff belt structure as described above and at portions above the bead parts reinforced with reinforcing layers and apexes are comparatively low in stiffness in respect of structure and constituent material as well as less resistant to deformation, thereby being formed into free balanced profiles approximate to those produced by high pressure inflation of the tire and exerting a great deal of influence upon the profile of the radially expansive surface of tread; a radius CR1 of curvature of the shoulder part of the carcass line 11 under the pressure corresponding to 5% of the specified maximum air pressure, as shown by a dotted line in FIG. 1, is larger than the other radius CR2 of curvature of the shoulder part in the shape most approximate to a free balanced profile 15 as shown by an alternate long and short dash line formed under the specified maximum pressure of air to be filled into the tire; and the object of this invention is most advantageously achieved when the ratio CR2/CR1 between radii of curvature of both profiles falls within the range from 0.7 to 0.95.

The carcass layer 1 of the radial structure is in contact with bead cores 7 and 7 at points f and f. A length arcuately extending from f to f represents the width of the carcass layer 1 between bead wires and is determined by the external size of tire, belt layer, and rubber gauge. Because of the low-stretchable or non-stretchable materials arranged at an angle of 90° with respect to the equatorial plane of the tire, the above mentioned length is not so much varied even when the tire is inflated with air of the maximum pressure.

In FIG. 1, represented are a profile 12 of the radially expansive surface of the carcass corresponding to a tire mounted on the rim R, inflated with air of the specified maximum pressure, and non-loaded, and another profile 11 of the radially expansive surface of carcass corresponding to a tire inflated with air of 5% of the specified maximum pressure and non-loaded. The carcass ply is in contact with bead wires at points f and f and passes through intersections X1 and X2 at which the locus S—S' of equatorial plane of the tire intersects with carcass profiles 11 and 12, respectively. The length f—f of the radially expansive surface of the carcass ply 1 is twice as much as that f-x. When the tire is inflated with air of 100% of the specified maximum pressure, a point C2 as an intersection at which the locus N2—N2' produced by a plane in contact with the tread edge E2 and parallel with the equatorial plane S—S' of the tire is apart from the equatorial plane S—S' by distance AC2 in the axial direction and is apart from center line Y—Y' by distance RC2 in the radial direction.

On the other hand, according to this invention, in a state that a tire is mounted on the specified rim without being loaded and inflated with air pressure of 50% of the specified maximum pressure, it is necessary to determine a profile 11 of carcass layer in such a way that an intersecting point C1, at which the locus N1—N1' touching the tread edge E1 and extendin in parallel with the locus S—S' of the equatorial plane of the tire intersecting with a carcass line 11, lies more inside radially and axially than a corresponding point C2 on the radially expansive surface profile 12 of a carcass ply of the tire put on the above mentioned state but inflated with air of the specified maximum pressure.

The intersecting point C1 is apart from the locus of the equatorial plane of the tire by axial distance AC1 shorter than the above mentioned distance AC2 and from the revolving axis axis Y—Y' of the tire by a radial distance RC1 shorter than the above mentioned distance RC2.

It is ideal that an intersecting points X2, at which a carcass line 12 produced when the inflating air pressure is at the maximum intersects with the locus S—S' of the equatorial plane, agrees with another intersecting point X1 at which a carcass line 11 produced when the inflating air pressure is equal to 5% of the maximum one intersects with the above mentioned locus S—S', due to strong hoop effect exerted by the low-stretchable and stiff cords composing the belt structure 3 and arranged in triangular patterns to firmly compress the carcass, however, in practice, because of elasticity of rubber and dispersion in degrees of angles of final arrangement of cords, a point X2 is adapted to be apart from the revolving axis Y—Y' of the tire by distance RX2 which is 100.5% or under, substantially 100.3% or under, of the radial distance RX1 by which the point X1 is apart from the above mentioned axis Y—Y'. That is to say, a relation as $RX1 \leq RX2 \leq 1.005 RX1$ is adopted to be maintained.

One of the most significant characteristics of this invention is that, in the above described state of the tire inflated with air of 100% of the specified maximum pressure, a circumferential length $2\pi RC2$ drawn by the point C2 corresponding to the tread edge E2, must be longer than another circumferential length $2\pi RC1$ drawn by the point C1 when the inflating air pressure is 5% of the specified maximum pressure and a ratio between lengths RC2/RC1 must always be greater than that RX2 to RX1. That is, a tire must be designed to satisfy a relation as $RC2/RC1 > RX2/RX1$. If $RX1=RX2$ and $RC1=RC2$, even when a tire is inflated, the radial distance from the points C1 and C2 to the revolving axis Y—Y' of the tire do not vary, that is, radii of curvature of tread surfaces, too, do not vary.

If $RX1=RX2$ and $RC1>RC2$, a radial distance between the point C1 and the revolving axis of the tire is reduced when the tire is inflated and, therefore, the radius of curvature produces a rounder surface of the tread. In other words, such conditions that $RX1=RX2$ and $RC1 \geq RC2$, and $RC2/RC1 < RX2/RX1$ are characteristics of a carcass profile line of tires depending to the prior art.

As a method of arranging a carcass line 11 at the shoulder part before inflation of the tire radially below a line approximate to a free balanced profile, i.e., a carcass line 12 produced when the tire is inflated with air of 100% of the maximum pressure, conceivable is the extension of a length of the normal running from the tread edge E1 to the carcass line 11, that is, a simple increase in the rubber gauge B1 for lowering the carcass line 11 below the carcass line 12, however, it must be taken into consideration that if the rubber gauge B1 is increased and, consequently, a higher degree of heat is generated in the tire due to increase in loss of internal energy of rubber, thereby causing decrease in durability of the tire to high speed running. Accordingly, with the decrease in the radius of curvature TR1 of the tread before inflating the tire and the increase in the length C1' (will be referred to as a camber height C1' hereinafter) of a perpendicular line extending from a line segment T—T' touching the equator of the tire and extending in parallel with the revolving axis Y—Y' of the tire toward the tread E1, and arrangement of a carcass line 11 below another carcass line 12 without increase in the rubber gauge B1 is made possible.

Figure 3:
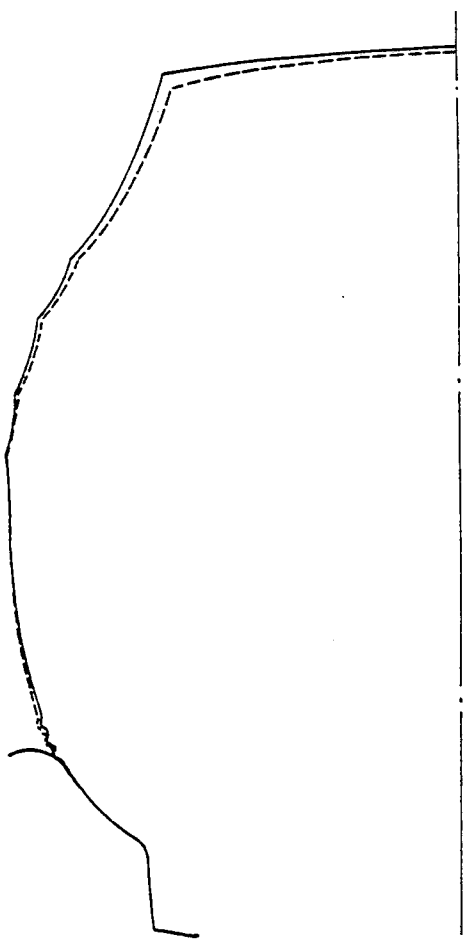
FIG. 3 is a sectional view showing a deformed state of profile of a tire according to this invention when the tire is inflated to the specified maximum pressure.
Figure 4:
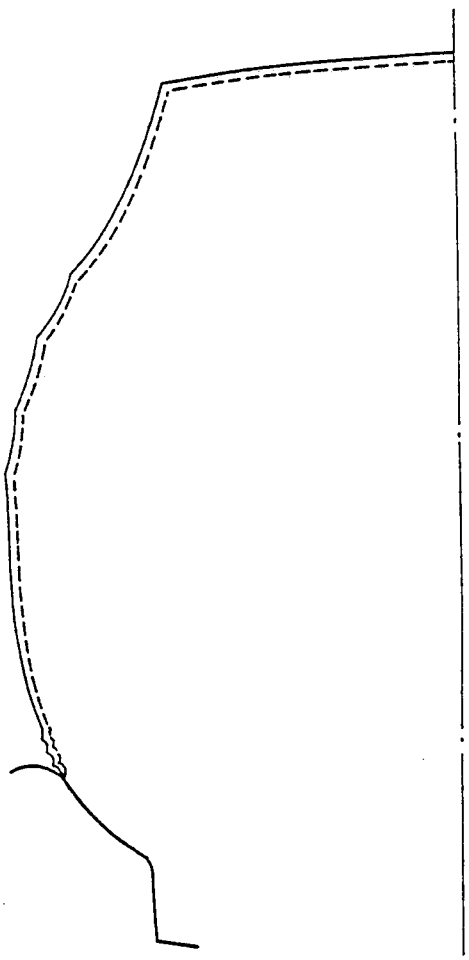
FIG. 4 is a sectional view showing a deformed state of profile of the conventional tire when the tire is inflated with air of the specified maximum pressure.

As described above, a carcass radial profile of the tire, in which a carcass line to be produced with tire inflation at 5% of the specified maximum air pressure is adapted to extend below another carcass line 12 to be produced with tire inflation at the above mentioned maximum air pressure, is approximate to a free balanced profile having the carcass line displaced upward with tire inflation, and, therefore, a tire according to this invention is largely deformed, as shown in FIG. 3 and apparent from an example of tire in size of 10.00R20 14PR, at a part including the buttress part extending above a level corresponding to 60% or more the cross-sectional height of the tire and the tread part, whereas a tire as shown in FIG. 4 and having a profile according to the prior art is substantially evenly deformed throughout. In FIGS. 3 and 4, the continuous line indicates an external profile of a tire inflated to have the specified maximum, internal air pressure (7.25 kg/cm$^2$) and the dotted line indicates an external profile of a tire inflated to have the internal air pressure of 0.36 kg/cm$^2$, that is, 5% of the specified maximum pressure of 7.25 kg/cm$^2$, both profiles having been impressed on plaster. Displacement of the carcass line was caused by the pressure of air blown into the tire, that is, variation in the external profile of the tire exerts influence upon distribution of tension in the carcass as a matter of course, and, in the case of a tire according to this invention, tension as well as apparent stiffness in the carcass is high at an area extending from the upper part of the side wall to the buttress and tread part where a degree of deformation is large.

Similarly, because of a larger degree of deformation (CR2−CR1) at both ends of the tread than that (RX2−RX1) at the equatorial plane of the tire, compressive strain acts on the groundcontacting surface of the tread part and increases transverse stiffness in cooperation with the aforesaid stiffness.

Figure 5:
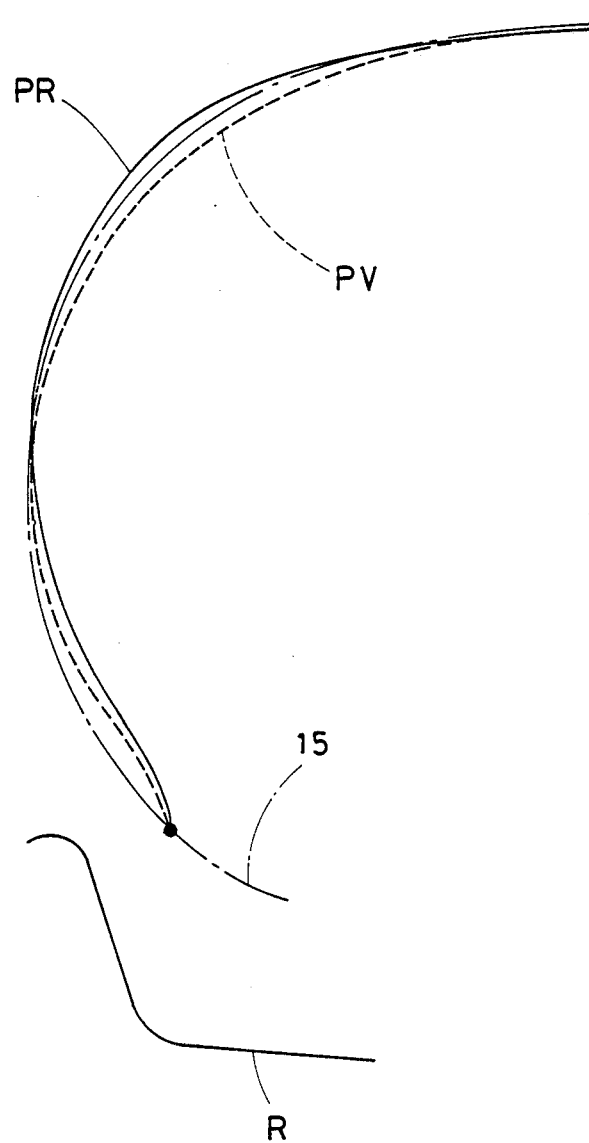
FIG. 5 is a sectional view of a carcass profile of tires presented for testing.

FIG. 5 shows a positional relation between carcass line of the conventional tire (PR) and of a tire (PV) according to this invention which were all drawn at the time of tire inflation with 5% air pressure and the standard carcass line (15) at the time of 100% air pressure inflation.

As described above, when the outer diameter of the tire increases at both shoulder parts of the tread due to inflation, the groundcontacting pressure of tire, when loaded, increases to act more strongly against the ground and the temperature rises at both shoulder parts, thereby causing an undesirable decrease in durability of the tire to high speed running; and, as a countermeasure thereto, according to the prior art, a depth of the above mentioned vertical main groove is classified as a "shallow groove" and reduced by providing a thin tread gauge, or rubber of low gripping performance is used, however, the life of tire is inevitably shortened thereby.

The inventor of this invention has completed this invention after examining a method of preventing temperature rise at both shoulder parts which is a great barrier to prolongation of the life of a tire while maintaining a large radius of curvature for flattening the tread.

In other words, as a result of selecting seven items such as a ratio between surface areas of cut grooves at the shoulder parts, shape index (cross-sectional area of loaded tire/free surface area), pattern transverse stiffness, pattern circumferential stiffness, volume of cut groove, shoulder tread gauge, and tread radius as factors of temperature rise and examining the correlation between temperature and the above factors depending on multiple regression analysis, it has been found that "circumferential stiffness" and "volume of cut groove" greatly contribute to temperature rise.

Figure 15:
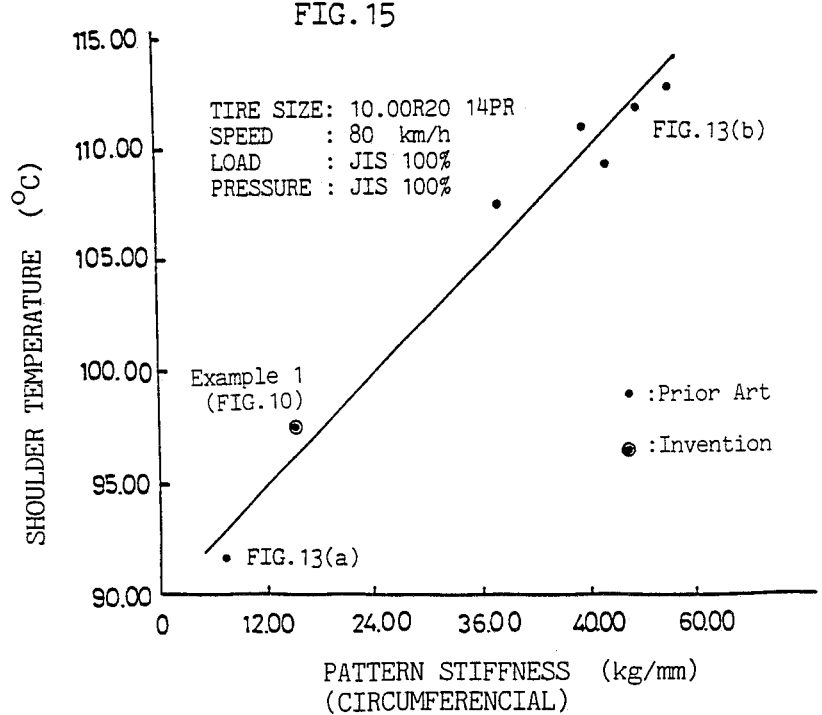
FIG. 15 is a graph showing the relation between pattern circumferential stiffness and temperature at the shoulder part.
Figure 20:
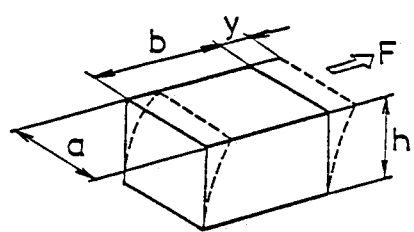
FIG. 20 is a view of a block for describing the secondary moment of the pattern stiffness index at the section of said block.
Figure 21:
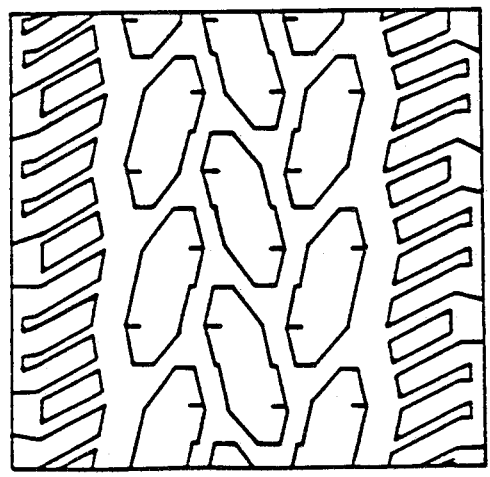
FIG. 21 is a plan view of tread surface pattern of an other embodiment of a tire according to this invention.

FIG. 15 graphically shows a relation between pattern circumferential stiffness at the shoulder part and temperature, wherein the lower the circumferential stiffness, the lower the temperature at the shoulder part. FIG. 16 shows a relation between the volume of cut groove and temperature, wherein the larger the volume of cut groove, the lower the temperature, but, as regards an embodiment of this invention, it can be understood that, even when the volume of cut groove is equal to tht of the conventional tire, the temperature is nearly 20° C. lower than that in the conventional tire. A comparison of transverse stiffness with the circumferential stiffness of a pattern indicates that, as shown in FIG. 17, the temperature in the pattern No. 4 (FIG. 13c) having transverse stiffness lower than circumferential one is 111° C. which is not low at all as shown in FIG. 18. Incidentally circumferential stiffness per pitch of the pattern No. 4 was 44.0 whereas the transverse stiffness was 25.2. From the above fact, it has been found that lowering of the temperature must depend on a reduction of circumferential stiffness rather than transverse one.

Figure 14:
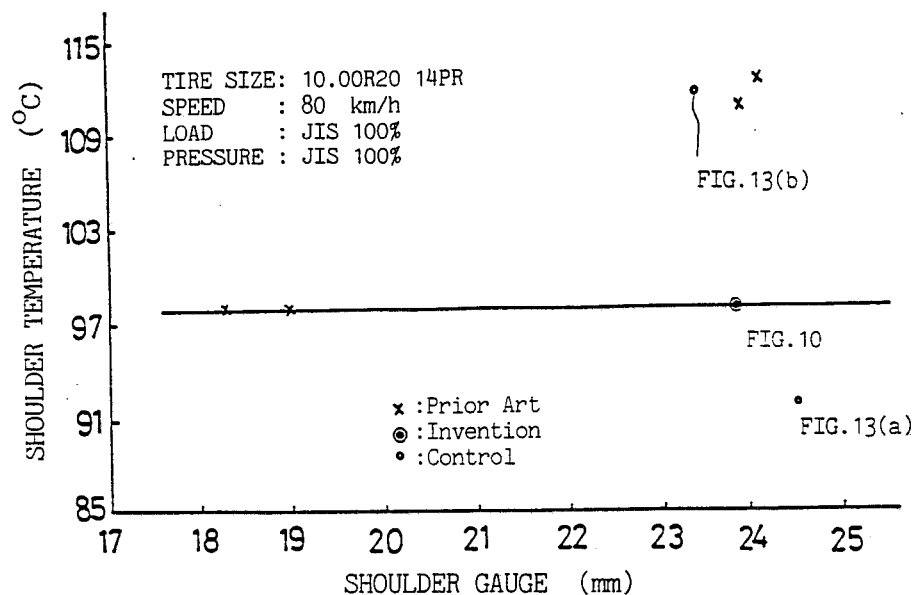
FIG. 14 is a graph showing the relation of rubber gauge with heat generation at the shoulder part with respect to the pattern of the Example of this invention (shown in FIG. 10), that of the Control Example (shown in FIGS. 13(a) and 13(b)), and that of the conventional tire.

FIG. 14 graphically shows that a relation between the tread gauge at the shoulder part and temperature in the tire, wherein the temperature rises with the increases in tread gauge in the conventional tire but, in the embodiment of this invention (FIG. 10), despite the shoulder gauge of 23.8 mm, the temperature of the tire is as low as that of the conventional tire having the gauge of 18 to 19 mm.

It is thinkable that lowering of the stiffness of the pattern depending on the pattern effect leads to a decrease in resistance of the tire to wear, however, in this respect, FIG. 19 shows that the values of pattern stiffness of tires shown in FIGS. 10 and 13a are 15.6 and 7.7, respectively, that is, 1:0.5 in terms of ratio, and volumes of cut grooves 4.16 cm³ and 14.4 cm³, respectively, i.e., 1:3.5 in ratio. In the pattern shown in FIG. 10, the volume of cut groove is small (FIG. 19) in proportion to pattern stiffness as compared with that shown in FIG. 13(a). That is to say, it has been found that, when reducing pattern stiffness, resistance to wear is reduced with the increase in volume of the cut groove and, therefore, by setting narrow the width t of the cut at the shoulder part as in the pattern shown in FIG. 10, control over temperature rise and prevention of decrease in resistance to wear are ensured. An appropriate width t of a cut s is 6 mm or under, preferably from 1 to 3 mm. A volume index of the cut is preferably within the range from 2.5 to 15. An index exceeding 16 results in too large volume of the cut which accelerates wear of rubber and, further, unfavourably generates noise or tendency to pick up pebbles. Too small an index, say not exceeding 2.4, degrades wet gripping and causes problems in safety of the vehicle. An index of circumferential stiffness is preferable when ranging from 30 to 70 but, when being low, that is not greater than 29, causes the rubber block to tend to chip off and, when being 71 or higher, invites problems as to generation of high temperature. Provision of a plurality of cut grooves for adapting the circumferential stiffness index to range from 30 to 70 improves ground contacting performance of the tread and reduces wear of the tire occurring during slippage, thereby the so-called shoulder wear is markedly eliminated.

An example of a pattern designed on the basis of the above findings will described with reference to FIG. 10.

The tread 11 includes a crown part CR defined by vertically running main grooves G1 and G2 and centered at the equatorial plane C of the tire so as to extend in width corresponding to 30 to 65% of the tread width TW, and also shoulder parts extending outside both sides of the crown part, in which vertically running grooves g1 and g2 are narrower than the main grooves G1 and G2 are arranged on the crown part, sub-grooves m and n extend between vertically running main grooves and between the main groove and narrow groove to communicate with each other, and rows of blocks B1, B2, and B3 each comprising approximately parallelogrammatic blocks B are arranged on the crown part. For the shoulder blocks SH lying outside vertically running main grooves G1 and G2, cuts S are provided in the circumferential direction of the tire at equal pitches of 15 mm each at an angle of 30° with respect to the axial direction of the tire, the width t and depth h of the cut s being 2 mm and 13 mm, respectively. A depth ho to be given to the vertically running main grooves G1 and G2 is of a deep groove type. For example, a depth ranging from 16.6 to 20.6 mm is applied to the tire size 10.00R20. In the present example, the depth is set at 18.00 mm. A width GW of the groove G in the shape of a U at cross-section A2—A2 is 14.5 mm. A vertical narrow groove g is 18 mm deep and 9.5 mm wide; a sub-groove m 5 mm wide and 11 mm deep; and another sub-groove n 2 mm wide and 9 mm deep. In the example No. 1 shown in FIG. 10, the pattern stiffness index and cut groove volume index are 64 and 10.5, respectively.

The definition of "pattern stiffness" and "volume index" of the cut groove will be explained hereinafter.

(Pattern stiffness index)

In said shoulder parts, pattern stiffness, which is pattern stiffness in contact length with ground under specified load and inner pressure, is defined by the following equations:

$$kp = \frac{F}{y} = 1 / \left( \frac{h^3}{3EI} + \frac{h}{AG} \right)$$ Equation 1 kp: Pattern stiffness (kg/mm)
F: Tangential force at ground contacting surface (kg)
y: Variation of pattern (mm)
h: Pattern depth (mm)
E: Elastic modulus at elongation of tread rubber (kg/mm²)
G: Shearing modulus (=E/3) (kg/mm²)
I: Secondary moment at block section (mm⁴)
  I=ab³/12 in the block shown in FIG. 10
A: Sectional area of block (mm²)

In the case of the actual pattern, the pattern depth is different from the h1 of the cut groove in the shoulder parts, and several number of blocks are adopted, so it is treated as follow:

The pattern stiffness at the surface (Kps), $$Kps = Kps1 + Kps2 + \ldots + Kpsn$$

to use h=h1 in the equation 1:

The pattern stiffness at base tread part (KpB) is to use h=ho−h1 (FIG. 1) in the equation 1;
The total pattern stiffness (KpT), $$KpT = 1 / \left( \frac{1}{Kps} + \frac{1}{KpB} \right)$$

The pattern stiffness in the case of no subgroove (Kpo) is to use h=ho in the equation 1; and Circumferential stiffness index of the pattern
= (KpT/Kpo) × 100

(Volume index of the cut groove)
The ratio of the volume of the groove to the total volume of the shoulder part.

$$\text{Volume index of the cut groove} = \frac{\text{Volume of cut grooves in shoulder part}}{\text{Surface area of shoulder part} \times \text{Pattern depth}}$$

(EXAMPLE)

Figure 13B:
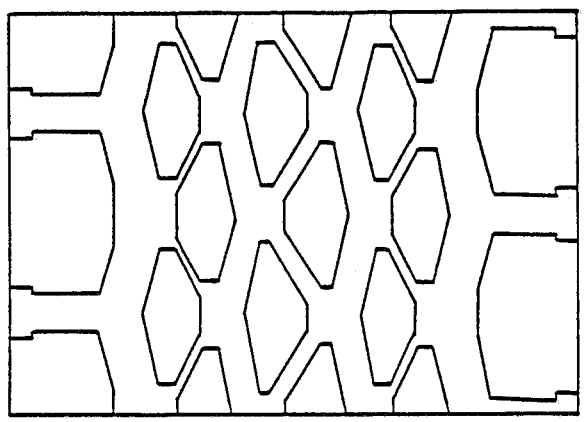
FIG. 13(b) is a developed view of a tread pattern provided with transverse grooves at shoulder parts according to the prior art.
Figure 13C:
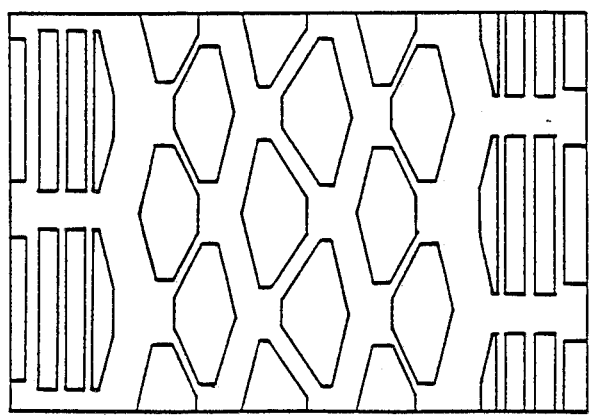
FIG. 13(c) is a view showing an example of a pattern in which transverse stiffness is lower than circumferential one.

On four tires made on trial, that is, a first one provided width a pattern and carcass line profile (PV) according to this invention as shown in FIG. 5 and a second one with a pattern of this invention and carcass line profile (PR) according to the prior art (Example 1 and Control Example 1, respectively); a third one with a pattern of the prior art as shown in FIG. 13(b) carcass line profile (PV) of this invention and a fourth one with the pattern of the prior art and carcass line profile (PR) of the prior art (Control Examples 2 and 3, respectively), various kinds of tests such as tread surface strain, tread cut, resistance to rolling, cornering force, and comfortableness in vehicle riding, durability to high speed running, tread wear, and wet gripping performance were performed.

Specifications of the test samples are listed in Table 4.

TABLE 4

|  | Example 1 | Control Example 1 | Control Example 2 | Control Example 3 |
|---|---|---|---|---|
| Tread radius of curvature, |  |  |  |  |
| (a) air pressure 5% (TR1) | 520 | 560 | 520 | 560 |
| (b) air pressure 100% (TR2) | 650 | 530 | 650 | 530 |
| Carcass line radius at shoulder part |  |  |  |  |
| (a) air pressure 5% (CR1) | 110 | 85 | 110 | 85 |
| (b) air pressure 100% (CR2) | 90 | 90 | 90 | 90 |
| Carcass line radius at crown part |  |  |  |  |
| (a) air pressure 5% (RX1) | 491.35 | 491.35 | 491.35 | 491.35 |
| (b) air pressure 100% (RX2) | 492.85 | 492.85 | 492.85 | 492.85 |
| Depth (h₁) of cut at shoulder part (mm) | 13 | 13 | 5.5 | 5.5 |
| Width (t) of cut at shoulder part (mm) | 2 | 2 | 11.5 | 11.5 |
| Ratio of cut surface area at shoulder part | 0.19 | 0.19 | 0.18 | 0.18 |
| Shape index at shoulder part | 0.44 | 0.44 | 0.72 | 0.72 |
| Pattern transverse stiffness at shoulder part (kg/mm) | 18.6 | 18.6 | 52.7 | 52.7 |
| Pattern circumferential stiffness at shoulder part (kg/mm) | 15.6(64) | 15.6(64) | 53.8(38) | 53.8(94) |
| Volume of cut at shoulder part (cm³) | 4.160(10.5) | 4.160(10.5) | 1.898(4.8) | 1.898(4.8) |
| Thickness of rubber at shoulder part (mm) | 23.9 | 23.9 | 23.5 | 23.5 |
| Depth (h₀) of vertically running main groove (mm) | 18.0 | 18.0 | 18.0 | 18.0 |
| Tread pattern | FIG. 10 | FIG. 10 | FIG. 13b | FIG. 13b |
| Carcass line profile | FIG. 5 (PV) | FIG. 5 (PR) | FIG. 5 (PV) | FIG. 5 (PR) |

The numeral in parenthesis, ( ), indicates an index.

In any of the foregoing tires, the carcass 1 is composed of one ply in which twisted steel cords (7×4/0.175 mm) are disposed at an angle of 90° with respect to the equatorial plane of the tire and the belt structure 3 is composed of twisted steel cords (1×3/0.20+6/0.38 mm), a first belt being disposed at 67° with respect to the equatorial plane of the tire whereas the second through fourth belts are at 16°.

A belt adajcent to the carcass layer is referred to as the first belt, and succeeding ones as the second, third, and fourth in turn. Component materials of belts such as tread rubber and others are common to all the belts.

| (Tread surface strain and Depth of cut) | |
|---|---|
| Tread surface strain *2 (%) | Depth of cut *1 (mm) |
| Example 1    −1.4 | 4.0 |

-continued

| (Tread surface strain and Depth of cut) | | |
|---|---|---|
| | Tread surface strain *2 (%) | Depth of cut *1 (mm) |
| Control Example 1 | +1.6 | 15.0 |

Figure 6A:
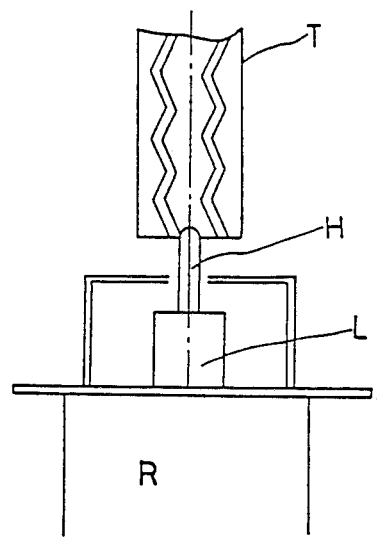
FIGS. 6(a) and (b) are views of the mechanism of a machine and a jig for showing a method of testing resistance of the tread to cutting.
Figure 6B:
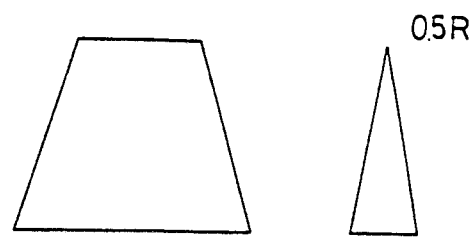

*1 The term "depth of cut" means a depth of a cut produced on the tread when a jig T as shown in FIG. 6 is pressed with a certain intensity of force to a tire inflated to have the specified maximum internal air pressure.
*2 "Tread surface strain" is a term defined in such a way that, when a length drawn on the tread surface between scale marks each 10 mm long along the direction of the tire axis increases with inflation of the tire, tensile strain (+) acts and, when said length decreases, compressive strain (−) acts.

A tire of this example was found to be excellent in resistance to cut when compressive strain is acting therein.

(Comfortableness in vehicle riding and Stability in driving)

Figure 7:
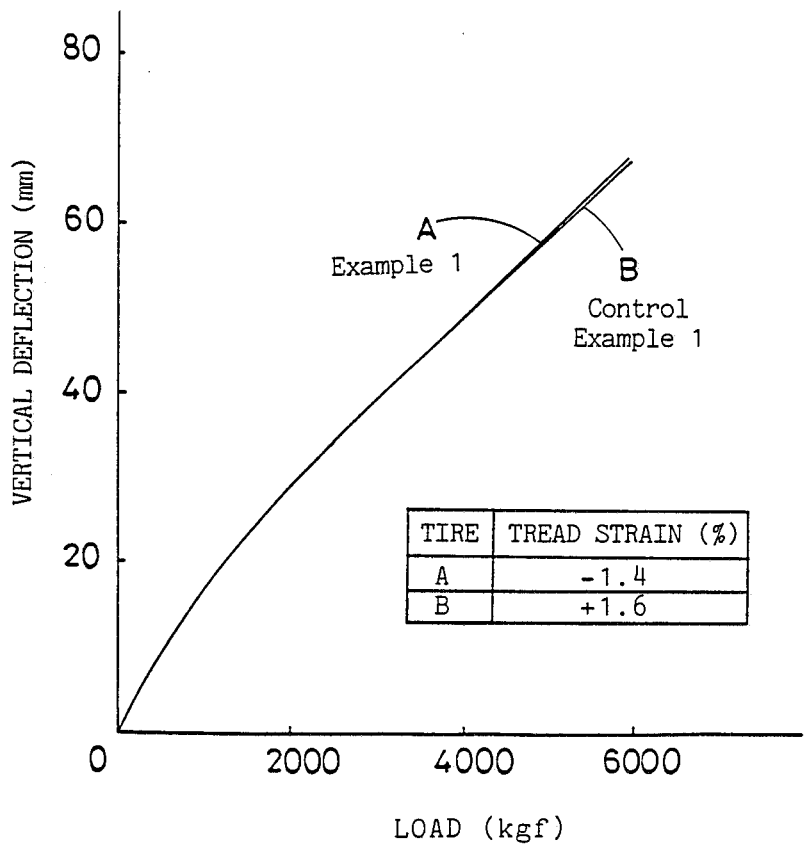
FIG. 7 is a curvilinear diagram showing the relations of load-deflection of tires.
Figure 8:
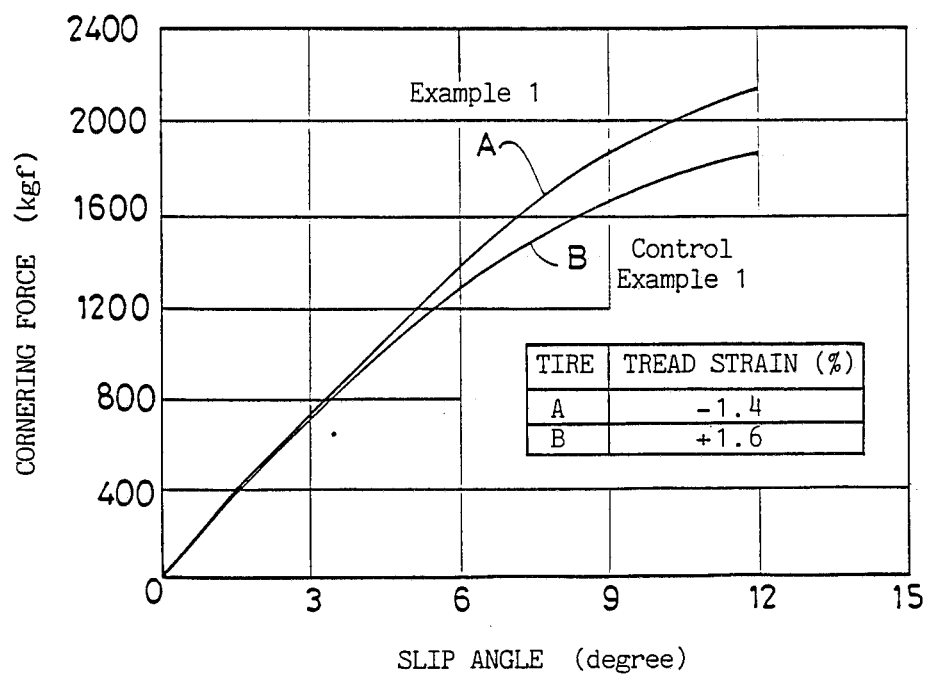
FIG. 8 is a curvilinear diagram showing cornering force at every degree of slip angle.

Results of investigation about the vertical spring rate as a scale for evaluating comfortableness in vehicle riding and stability in driving and about the relation between cornering force and tread surface strain provide a data that, as shown in FIGS. 7 and 8, the tire of Example 1 of this invention in which compressive strain acts in a manner which is not different in degree of deflection from Control Example 1 in which tensile strain acts but approximately 10% higher in intensity of cornering force. This data reflects that high tension of the carcass ply acting on the portion extending from the buttress to the tread part and compressive strain acting in the direction of the tire axis provides higher transverse stiffness at the ground contacting surface.

From the above described facts, it can be said that comfortableness in vehicle riding provided by a tire having a profile according to this invention is not different, as will be referred to later again, from that of the conventional tire but is superior in respect of stability in driving.

For finding the influence of the carcass profile, intensity of reactive force generated in the revolving axes of tires of Control Example 1 and Example 1 during running over protrusions in the test course and data as shown in Table 3 for comparing two examples with respect to comfortableness in riding during joint were obtained.

Table 3 shows the results of measurements of reactive force in Example 1 in terms of an index based on the assumption that the index of the reactive force in Control Example 1 is 100, wherein the larger the index, the better the comfortableness of vehicle riding.

TABLE 3

| Comparison of test results of comfortableness in riding. | | | |
|---|---|---|---|
| | Speed | Control Example 1 | Example 1 |
| Vertical reactive force during ride over protrusions | 50 km/h | 100 | 100 |
| | 80 km/h | 100 | 102 |
| Back-and-forth reactive for during ride over protrusions | 50 km/h | 100 | 101 |
| | 80 km/h | 100 | 100 |

From Table 3, a tire of Example 1 is found superior to the conventional one providing comfortableness in vehicle riding. The reason for the above fact is that a great deal of flexional deformation inflicted on the tire when the tire rides over protrusions on the ground is absorbed side wall parts of the tire. In the tire according to the invention, tension in the carcass ply is low in areas extending from positions, at which deformation absorption capacity reaches the maximum and between which the largest width of the tire lies, to the bead parts on the side wall portions lower than the above mentioned points, whereby tension distribution in these areas is capable of absorbing flexional deformation comparatively easily.

(Resistance to Rolling)

Figure 9:
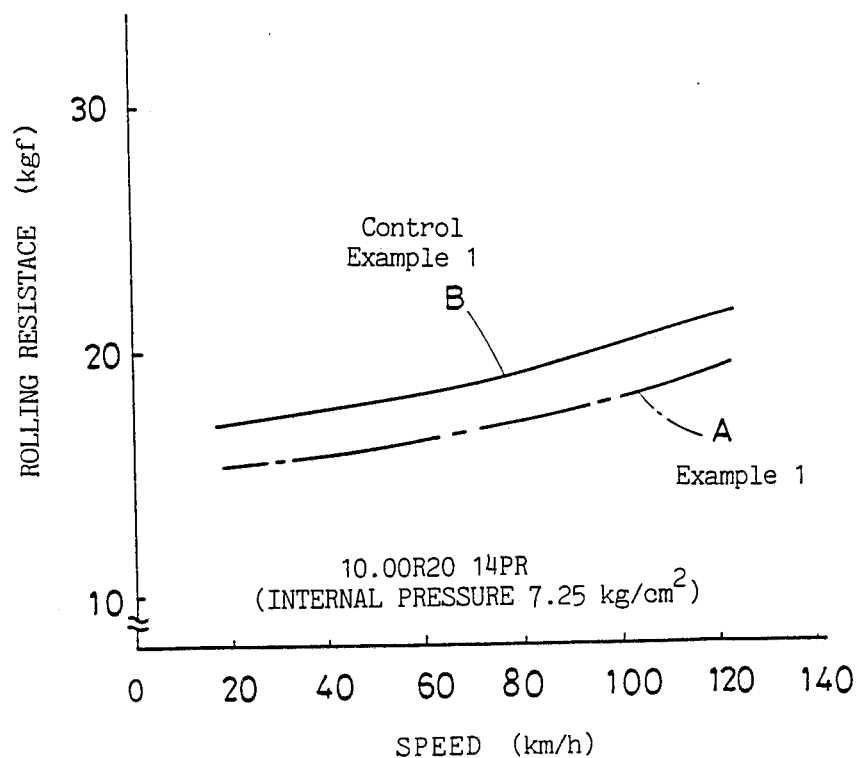
FIG. 9 is a curvilinear diagram showing the relation of speed with resistance to rolling.

Comparison of resistance to rolling of a tire of Example 1 according to this invention with that of Control Example 1 of the prior art, as shown in FIG. 9, indicated that the former is 10% or more below the latter and, proportionately, contributes to reduction in fuel consumption. The reason is that the movement of rubber in the tire of this invention occurring every revolution of the tire is smaller than that of the conventional tire in the areas extending from the grounding surface to buttress parts and energy loss in the tire is reduced. The same remark as above is applicable to heat generation in the tire, too.

Resistance to rolling is evaluated by resistance of a tire during running after the tire is pressed to the surface of a steel drum of 1.7 m in diameter so as to be loaded as specified, and driven for warming up for about 45 minutes at a speed and with internal pressure as specified.

(Durability to High Speed Running)

In view of improved road conditions of these days, importance must be attached to durability of a tire of such kind as above and test of durability to high speed running was performed according to the following method, results thereof being shown in Table 5.

TABLE 5

| | Breaking speed | Length of time of running |
|---|---|---|
| Example 1 | 130 km/h | 110 min. to breakage |
| Control Example 1 | 120 km/h | 50 min. to breakage |
| Control Example 2 | 110 km/h | 100 min. to breakage |
| Control Example 3 | 100 km/h | 50 min. to breakage |

Tires were driven on a drum type driving tester according to the stepped speed running method on conditions that:
Load: 3,780 kg
Initial internal pressure: 7.25 kg/cm$^2$
Rim: 7.50 V
wherein results were evaluated by the level of speed at which the tire was broken due to heat generation and the length of time spent for running at the above speed. A tire of Example 1 of this invention cleared a speed of 130 km/h but a tire of Control Example 1 could clear only 120 km/h, lower by one order than 130 km/h. Control Example 3 having conventional pattern plus conventional carcass ply showed a lower level of durability (100 km/h). Control Example 2 showed a level of 110 km/h because of influence of the pattern. A tire of this invention designed to be provided with "cut grooves" on the shoulder zones for reducing pattern circumferential stiffness and to cause compressive strain to act upon tread rubber when the tire is inflated reduced the amount of movement of the rubber body, controlled heat generation in the shoulder parts, and provided "high degree of durability".

(Resistance to Wear)

As regards resistance of the tread to wear, comparison tests using the actual truck wear were performed and amounts of wear of treads per 1,000 km running were compared by measurements of grooves after 50,000 km running. As shown in Table 6, a tire according to this invention demonstrated excellent resistance to wear thanks to heat generation of a low degree, more uniform distribution of ground contacting pressure, and high gripping performance.

TABLE 6

| Results of tests of resistance to wear using actual truck tests | |
|---|---|
| | Index of wear of tread* |
| Control Example 1 | 100 |
| Control Example 2 | 100 |
| Control Example 3 | 90 |
| Example 1 | 115 |

*A larger value means a superior performance. The above ratio may be regarded as a ratio between life span of treads.

(Wet grip performance)

Values obtained from comparison of wet grip performance are shown in Table 7.

TABLE 7

| | Control Example 1 | Control Example 2 | Control Example 3 | Example 1 |
|---|---|---|---|---|
| Index of wet slip | 110 | 105 | 100 | 115 |

Wet grip performance was observed by confirming braking distance travelled by the actual truck driven at a speed of 80 km/h on the asphalt-paved wet road, and indicated in terms of index on the assumption that an index of braking distance of Control Example 3 is 100. In this case, too, the larger the index, the better the performance, and a tire of example 1 which exhibited a strong braking force is verified to be excellent in wet grip performance as one important requirements for safety.

(Effect of the Invention)

As has been described, this invention provide a well-balanced tire in which the radially outer surface profile is expanded radially outwardly at both shoulder parts when the tire is inflated and tread pattern circumferential stiffness as well as an index of groove volume is optimized so that resistance to wear, durability to high speed running (low degree of heat generation), resistance to cutting, and resistance to rolling (low fuel consumption) including wet grip performance and stability in vehicle driving may be advantageously improved without reducing comfortableness in vehicle riding when subjected to jolting.

What is claimed is:

1. A pneumatic radial ply tire comprising
a carcass layer reinforced by at least one ply of substantially radially arranged substantially unstretchable parallel cords;
a tread on said carcass layer, having at least two main grooves extending circumferentially in a zigzag, wavy, or straight line to divide the tread into two shoulder parts and a crown part therebetween having width of about 30 to 65% of the tread width;
a belt layer, arranged between the tread rubber and said carcass layer adjacent to the carcass layer, and including at least two plies of parallel cords laid at an angle of 10° to 70° to the tire circumferential direction so as to be crosswise with each other;
said tread, when the tire is mounted on a rim officially specified for use therewith and inflated with air, having a radially outer profile curved in a plane including the tire axis, and the radius of curvature thereof increasing with an increase in inflation air pressure and satisfying a relation $1.2 \leq TR2/TR1 \leq 1.5$ wherein TR1 is the radius when the tire is inflated to a pressure of 5% of the specified maximum pressure, and TR2 is the radius when inflated to the specified maximum pressure;
said tread shoulder parts each being provided with a plurality of axially extending narrow grooves of less than 6 mm in width so that a volume index of the narrow grooves is in a range of 2.5 to 15, and a circumferential stiffness index in each shoulder part in a range of 30 to 70, wherein the circumferential stiffness index in the shoulder part and the volume index of the narrow grooves are defined as follows:

Volume Index = $V/(S \times d) \times 100$

V: total volume of the narrow grooves in the shoulder part
S: surface area of the shoulder part
d: depth of the main groove Circumferential Stiffness Index = $(Kpt/Kpo) \times 100$ Kpt: circumferential stiffness in the shoulder part after the narrow grooves are provided
Kpo: circumferential stiffness in the shoulder part before the narrow grooves are provided Circumferential Stiffness = $F/y$ F: tangential force in the circumferential direction of the tire at the ground contacting surface of the shoulder part
y: variation of the ground contacting surface in the circumferential direction of the tire.

2. A pneumatic radial ply tire as set forth in claim 1, wherein the depth of the narrow grooves is not larger than that of the main grooves, the circumferential pitch between the adjacent narrow grooves is in a range from 1.1 to 0.1% of the tire circumference at the tread center, and the angle of the center line of each narrow groove is 0° to 45° to the tire axial direction.

3. A pneumatic radial ply tire as set forth in claim 1, wherein said tread shoulder parts are each provided with at least a row of blocks substantially separated by said narrow grooves.

4. A pneumatic radial ply tire as set forth in claim 1, wherein said tread crown part is provided with at least a rib or a row of blocks.

5. A pneumatic radial ply tire as set forth in claim 1, wherein the width of said belt layer is in the range of 80 to 95% of the tread width.

* * * * *